(12) United States Patent
Yamazaki

(10) Patent No.: US 9,363,415 B2
(45) Date of Patent: Jun. 7, 2016

(54) PRINTING APPARATUS, PRINTING DATA GENERATION APPARATUS AND METHOD THEREFOR, AND PRINTING DATA GENERATION PROGRAM

(71) Applicant: SEIKO EPSON CORPORATION, Tokyo (JP)

(72) Inventor: Satoshi Yamazaki, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/631,417

(22) Filed: Feb. 25, 2015

(65) Prior Publication Data

US 2015/0256714 A1    Sep. 10, 2015

(30) Foreign Application Priority Data

Mar. 4, 2014  (JP) ................ 2014-041097

(51) Int. Cl.
  *H04N 1/40* (2006.01)
  *H04N 1/405* (2006.01)
  *G06K 15/02* (2006.01)
  *H04N 1/52* (2006.01)
  *G06K 15/00* (2006.01)

(52) U.S. Cl.
  CPC .......... *H04N 1/4053* (2013.01); *G06K 15/1876* (2013.01); *G06K 15/1881* (2013.01); *H04N 1/52* (2013.01)

(58) Field of Classification Search
  USPC .............. 358/3.05, 3.03, 3.04, 3.06; 382/252, 382/274
  See application file for complete search history.

(56) References Cited

U.S. PATENT DOCUMENTS

| | | |
|---|---|---|
| 5,553,166 A | 9/1996 | Kakutani |
| 5,764,811 A | 6/1998 | Kakutani |
| 7,965,419 B2 | 6/2011 | Kakutani |
| 8,379,271 B2 | 2/2013 | Kakutani |
| 8,416,457 B2 | 4/2013 | Kakutani |
| 2004/0190071 A1* | 9/2004 | Thakur ................ H04N 1/4052 358/3.04 |
| 2011/0063684 A1* | 3/2011 | Kakutani ............. H04N 1/4053 358/3.03 |

FOREIGN PATENT DOCUMENTS

| | | |
|---|---|---|
| JP | 3360391 B2 | 12/2002 |
| JP | 2007-015359 A | 1/2007 |
| JP | 2011-066594 A | 3/2011 |

* cited by examiner

*Primary Examiner* — Quang N Vo
(74) *Attorney, Agent, or Firm* — Global IP Counselors, LLP

(57) ABSTRACT

A printing apparatus includes an input unit; a halftone processing unit; and a print unit. The halftone processing unit includes a comparison unit comparing one of a plurality of threshold values and a data gradation value, and an error diffusion unit generating dot data by comparing the data gradation value with an error diffusion threshold value. In a case where the data gradation value is less than the threshold value, the error diffusion threshold value is set to a high threshold value greater than a low threshold value. The high threshold value is set to a maximum value of the data gradation value or higher where the data gradation value is a predetermined value or higher, and to a value lower than the maximum value in a predetermined gradation range not less than the predetermined value.

11 Claims, 13 Drawing Sheets

FIRST EMBODIMENT

COMPARATIVE EXAMPLE

Fig. 10A
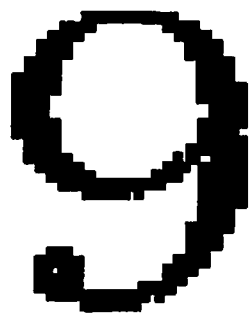
FIRST EMBODIMENT
COMPARATIVE EXAMPLE
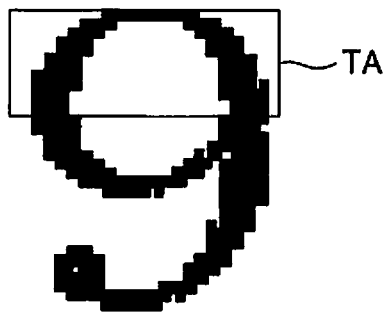
Fig. 10B
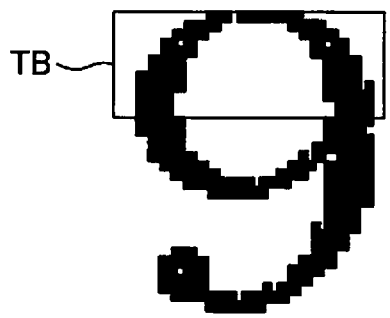
Fig. 10C

PRINTING APPARATUS, PRINTING DATA GENERATION APPARATUS AND METHOD THEREFOR, AND PRINTING DATA GENERATION PROGRAM

CROSS-REFERENCE TO RELATED APPLICATIONS

This application claims priority to Japanese Patent Application No. 2014-041097 filed on Mar. 4, 2014. The entire disclosure of Japanese Patent Application No. 2014-041097 is hereby incorporated herein by reference.

BACKGROUND

1. Technical Field

The present invention relates to a technique for printing by using image data and a technique for generating printing data.

2. Related Art

Known halftone processing with which multi-gradation image data is printed by dot data which has a low number of gradations include an error diffusion method for allocating the density error of a case where a gradation number conversion has been done to the surrounding pixels, and ordered dithering for generating dot data by using a dither mask that has received a threshold value arrangement of favorable dispersibility. In a case where a dither mask to which a blue noise characteristic has been applied is used or where a Bayer-type dither mask is used, then the dot arrangement will have favorable dispersibility, and there will be excellent reproducibility of images with two-dimensional spreading of data having relatively small gradation changes. This ordered dithering also has the advantage of making it possible to control the formation of dots by imparting a specific characteristic to the arrangement of threshold values in the dither mask.

As an example, a technique illustrated in Japanese Laid-Open Patent Application Publication No. 2007-15359 (patent document 1) listed below comprises independently creating a dither mask used for the determination of dot formation during forward movement in a case where bidirectional printing is being carried out, and a dither mask used for the determination of dot formation during return movement. Applying a blue noise characteristic to each of the dither masks also has made it possible to print with little decrease in image quality with respect to the displacement of dot formation positions in the bidirectional printing positions.

The applicants have proposed an approach for taking advantage of both such dithering and an error diffusion method (see Japanese Laid-Open Patent Publication No. 2011-66594 (patent document 2)). With this technique, gradation values of pixels in question are first compared with threshold values constituting a dither mask, and according to the results of comparison, the threshold values used for the error diffusion method are varied and also the threshold values are changed according to the gradation values of the target pixels.

SUMMARY

The pertinent approach is an excellent one that provides the ability to control the degree to which the respective features of the error diffusion method and the dithering are reflected in the dot data that is generated, and the range of application thereof is wide. The applicants have further improved this approach and succeeded in raising even higher the quality of images in a region where the ink duty needs to be substantially 100%. Using the approach of the present invention would make it possible to solve the problem where missing dots occur and image quality decreases in a region where the image data has high gradation values and the ink duty needs to be substantially 100%. Moreover, in conventional image processing and printing, there has been the desire to reduce the size of apparatuses, lower costs, conserve resources better, facilitate manufacturing, enhance usability, and so forth.

The present invention has been made in order to at least partially solve the aforementioned problems, and can be realized in the form of the following modes.

(1) As one embodiment of the present invention, provided is a printing apparatus for printing image data representative of a predetermined image. This printing apparatus includes an input unit configured to input the image data, a halftone processing unit configured to generate dot data representative of presence or absence of a dot formation on the basis of the image data, and a print unit configured to use the generated dot data to print the image. The halftone processing unit may include a comparison unit configured to compare one of a plurality of threshold values and a data gradation value that is a gradation value of the inputted image data, and an error diffusion unit configured to generate the dot data by comparing the data gradation value with an error diffusion threshold value that is a threshold value used in determination of presence or absence of a dot formation in an error diffusion method. Herein, in a case where a result of comparison of the comparison unit is that the data gradation value is less than the threshold value, the error diffusion threshold value is set to a high threshold value greater than a low threshold value that is set in a case where the data gradation value is not less than the threshold value. The high threshold value may be set to a maximum value of the data gradation value or higher where the data gradation value is a predetermined value or higher, and to a value lower than the maximum value in a predetermined gradation range not less than the predetermined value.

When the high threshold value takes a lower value than the maximum value in the predetermined gradation range, then the generation of dots is less likely to be suppressed, and missing dots in a region where the ink duty needs to be substantially 100% is suppressed.

(2) In the printing apparatus, the high threshold value may be set as a value that decreases monotonically with respect to the data gradation value in the predetermined gradation range. Having the high threshold value decrease monotonically causes the changes in dot generation to be continuous, and makes a specific dot pattern or the like less likely to occur.

(3) The plurality of threshold values may be prepared as a dither mask that is used for ordered dithering. So doing makes it possible to obtain dot data of a characteristic close to the generation of dot data by ordered dithering in a case where the effects from dithering are strengthened.

(4) The dither mask may have a blue noise characteristic. So doing makes it possible to endow the dot data generated under the influence of dithering with a characteristic close to a blue noise characteristic.

(5) The high threshold value may be set as a value that increases monotonically in accordance with the data gradation value as far as the predetermined value. So doing causes changes in the dot generation to be continuous, and makes a specific dot pattern or the like less likely to occur.

(6) The low threshold value may be set to a value less than a minimum value of the data gradation value where the data gradation value is a preset value or below. So doing causes a dot to necessarily be formed when the low threshold value is used to determine the presence or absence of dot formation by the error diffusion method, and makes it possible to match the characteristic of the dot data to a characteristic caused by dithering.

(7) The halftone processing unit may generate the dot data on the basis of the result of comparison of the comparison unit instead of a process by the error diffusion unit in a case where the data gradation value is not less than the threshold value in a predetermined range including the predetermined value. So doing makes it possible to omit a part of the error diffusion process and makes it possible to reduce the burden of processing.

(8) The error diffusion unit may be one that, when a gradation error produced in association with the generation of the dot data is being diffused to a plurality of pixels of a periphery of a target pixel for which the dot data is generated, carries out error diffusion so that a sum of gradation error diffused to the plurality of pixels of the periphery is less than the produced gradation error in at least a part of a predetermined gradation range not less than the predetermined value. So doing reduces accumulation of error that is produced when the dots are formed in at least a part of the predetermined gradation range, and prevents the occurrence of the phenomenon where a dot is not formed due to the accumulation of diffused error. As a result of this, it is possible to even more reliably suppress the generation of missing dots in a region where the ink duty needs to be 100%.

(9) In the error diffusion unit, when an amount of diffusion by which the produced gradation error is diffused to each of the plurality of pixels of the periphery is decided by multiplying the gradation error produced in the target pixel by a diffusion factor establishing a proportion of diffusion to each of the pixels of the periphery, then this processing can be easily realized by having a sum of the diffusion factor be less than 1.

(10) The present invention can be implemented as a printing data generation apparatus for generating printing data of image data representative of a predetermined image. This printing data generation apparatus may include an input unit configured to input the image data, and a halftone processing unit configured to generate dot data representative of presence or absence of a dot formation on the basis of the image data, the halftone processing unit including a comparison unit configured to compare one of a plurality of threshold values and a data gradation value that is a gradation value of the inputted image data, and an error diffusion unit configured to generate the dot data by comparing the data gradation value with an error diffusion threshold value that is a threshold value used in determination of presence or absence of a dot formation in an error diffusion method. In a case where a result of comparison of the comparison unit is that the data gradation value is less than the threshold value, then the error diffusion threshold value may be set to a high threshold value greater than a low threshold value that is set in a case where the data gradation value is not less than the threshold value, and the high threshold value may be set to a maximum value of the data gradation value or higher where the data gradation value is a predetermined value or higher, and to a value lower than the maximum value in a predetermined gradation range not less than the predetermined value.

With this printing data generation apparatus, when the high threshold value takes a lower value than the maximum value in the predetermined gradation range, then the generation of dots is less likely to be suppressed, and missing dots in a region where the ink duty needs to be substantially 100% is suppressed.

(11) The present invention can additionally be implemented as a method or program. For example, the present invention can also be implemented as a method for generating printing data of image data representative of a predetermined image. This method may include inputting the image data, comparing one of a plurality of threshold values and a data gradation value that is a gradation value of the inputted image data, in a case where a result of comparison is that the data gradation value is less than the threshold value, setting an error diffusion threshold value that is a threshold value used in determination of presence or absence of a dot formation in an error diffusion method to a high threshold value greater than a low threshold value that is set in a case where the data gradation value is not less than the threshold value, and using the set error diffusion threshold value to generate dot data representative of presence or absence of a dot formation by the error diffusion method. Herein, the high threshold value may be set to a maximum value of the data gradation value or higher where the data gradation value is a predetermined value or higher, and to a value lower than the maximum value in a predetermined gradation range not less than the predetermined value. This method of generating printing data also makes it possible to achieve actions and effects similar to the printing apparatus described above.

(12) The present invention can also be implemented as a printing data generation program for generating printing data of image data representative of a predetermined image. This program may cause a computer to implement a function for inputting the image data, a function for comparing one of a plurality of threshold values and a data gradation value that is a gradation value of the inputted image data, in a case where a result of comparison is that the data gradation value is less than the threshold value, a function for setting an error diffusion threshold value that is a threshold value used in determination of presence or absence of a dot formation in an error diffusion method to a high threshold value greater than a low threshold value that is set in a case where the data gradation value is not less than the threshold value, and a function for using the set error diffusion threshold value to generate dot data representative of presence or absence of a dot formation by the error diffusion method. Herein, the high threshold value may be set to a maximum value of the data gradation value or higher where the data gradation value is a predetermined value or higher, and to a value lower than the maximum value in a predetermined gradation range not less than the predetermined value. In a case where a computer is made to execute this program, actions and effects similar to the aforementioned method can be obtained.

The present invention can also be implemented as a variety of modes other than a printing apparatus or image data generation apparatus. For example, the present invention can be implemented in modes such as a method of manufacturing a printing apparatus, a method of controlling a printing apparatus, a computer program for implementing these methods of control, or a non-temporary recording medium onto which this computer program has been recorded.

BRIEF DESCRIPTION OF THE DRAWINGS

Referring now to the attached drawings which form a part of this original disclosure:

FIGS. 10A, 10B and 10C are descriptive views illustrating one example of the display of a character in a case where the first embodiment has been applied;

DETAILED DESCRIPTION OF EMBODIMENTS

A. First Embodiment

The first embodiment of the present invention shall now be described.

Figure 1:
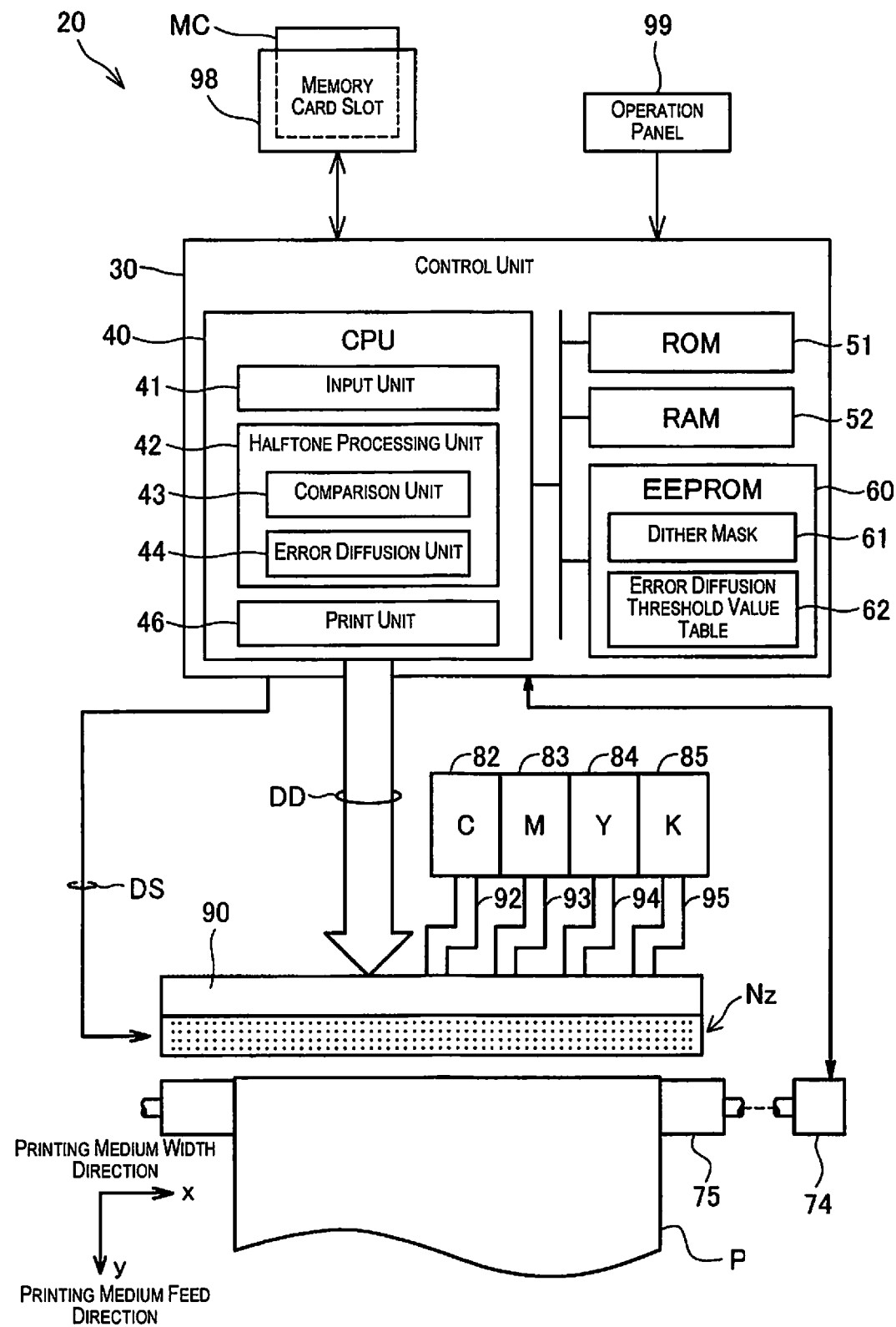
FIG. 1 is a schematic diagram illustrating an image processing apparatus according to a working example.

A-1. Apparatus Configuration:

FIG. 1 is a schematic diagram illustrating a printer 20 serving as a first embodiment of a printing apparatus of the present invention. The printer 20 is a so-called line printer, and is an inkjet printer with which four colors of ink (described below) are used. As is depicted, the printer 20 is constituted of: a mechanism for using a paper feeding motor 74 to drive a paper feeding roller 75 and convey a printing medium P; a mechanism for driving a printing head 90 provided to a position facing the printing medium P, to discharge ink and form dots; and a control unit 30 for governing the exchange of signals with an operation panel 99 as well as the paper feeding motor 74 and the printing head 90. In the present embodiment, the paper feeding roller 75 also serves as a platen, but a platen may also be in the form of a separate body from the paper feeding roller. In such a case, the form may also be a flat platen that has a flat surface. The paper feeding roller 75 may be provided respectively upstream and downstream of the printing head 90.

The printing head 90 receives, also across the width direction of the printing medium P, a large number of nozzles Nz capable of discharging cyan ink C, magenta ink M, yellow ink Y, and black ink K, as color inks. Provided at a one-to-one correspondence to this plurality of nozzles are piezoelectric elements (not shown) serving as actuators. The piezoelectric elements are driven by a data signal DD corresponding to dot data and by a drive signal DS. As the actuators for discharging the ink from the nozzles Nz, it would be possible to employ a variety of configurations, not limited to piezoelectric elements but instead also including those of the heat type which discharge by making use of explosive boiling of the ink, and those where a laser is used. It shall be readily understood that the formation of ink dots is not limited to inkjet, but rather it would be possible to employ a variety of formats, such as thermal transfer or thermal sublimation using ink ribbons, a format where a latent image is formed on a photosensitive drum, or a serial printer where the ink is discharged from the nozzles while a printing head is being moved reciprocally in the width direction of the printing medium.

Each of the colors of ink is supplied to the printing head 90 via ink supply tubes 92 to 95 from ink cartridges 82 to 85 for color ink, in which the colors of ink are respectively stored. Light cyan ink Lc, light magenta ink Lm, and the like may also be used as ink colors, in addition to the CMYK stated above. It shall be readily understood that special color inks such as red, blue, or green may be used, and that a so-called metallic ink such as gold or pearl white may be used. Moreover, the configuration may be one provided with an ink system for monochrome printing.

The control unit 30 is provided with a CPU 40, a ROM 51, a RAM 52, and an EEPROM 60, and is provided with a configuration with which these are interconnected by a bus. The control unit 30 deploys a program stored in the ROM 51 or in the EPPROM 60 to the RAM 52, and executes the program, thereby functioning also as an input unit 41, a halftone processing unit 42, and a print unit 46, in addition to controlling the overall operation of the printer 20. The function of the halftone processing unit 42 encompasses functions serving as a comparison unit 43 and as an error diffusion unit 44.

The print unit 46 is a circuit for driving the printing head 90; a signal corresponding to dot data is outputted to the printing head 90, as is a drive signal DS for driving a plurality of piezoelectric elements at one time. The piezoelectric elements are formed into a group for each color in CMYK, and are driven on a group-by-group basis by the signal DD corresponding to the dot data, which is retained in a latch (not shown), and by the drive signal DS outputted at a predetermined timing. When the drive signal DS is applied in a case where the signal DD is ON (where the dot data has a value of 1), then the piezoelectric elements are extended, which applies pressure on ink inside an ink chamber (not shown) and causes ink droplets to be discharged from the nozzles Nz. The printer 20 of the present embodiment is a line printer, and therefore the nozzles of each color are arranged with displacement at a predetermined pitch in a direction of feeding of the printing medium P. Nozzles for the same color of ink also have a so-called staggered arrangement in which the nozzles are alternately shifted in the direction of feeding of the printing medium, in order to increase the resolution in the width direction of the printing medium. As such, the nozzles will each have a different drive timing in a case where dots are being formed in the same position in the direction of feeding of the printing medium P. For this reason, as shall be described below, a rearrangement process is carried out, in which dot data obtained by processing gradation data of an image intended to be formed is matched to the nozzle arrangement. The processes of each of the functional units, including this process of the print unit, shall be described in greater detail below, with reference to the flow charts in FIGS. 2 and 3.

The EEPROM 60 stores a dither mask 61 as well as an error diffusion threshold value table 62. The dither mask 61 is intended to be used in a halftone process described below, and has the size of 256 wide (x: the width direction of the printing medium) and 64 tall (y: the direction of feeding of the printing medium), as illustratively exemplified in part in FIG. 4. This dither mask 61 is one in which a plurality of threshold values THn_d are arrayed. These threshold values THn_d take a value from 1 to 255 in the present embodiment. Each of the threshold values THn_d is arranged so that the spatial frequency of dots formed by comparison with the threshold values will be a so-called blue noise characteristic.

Figure 5:
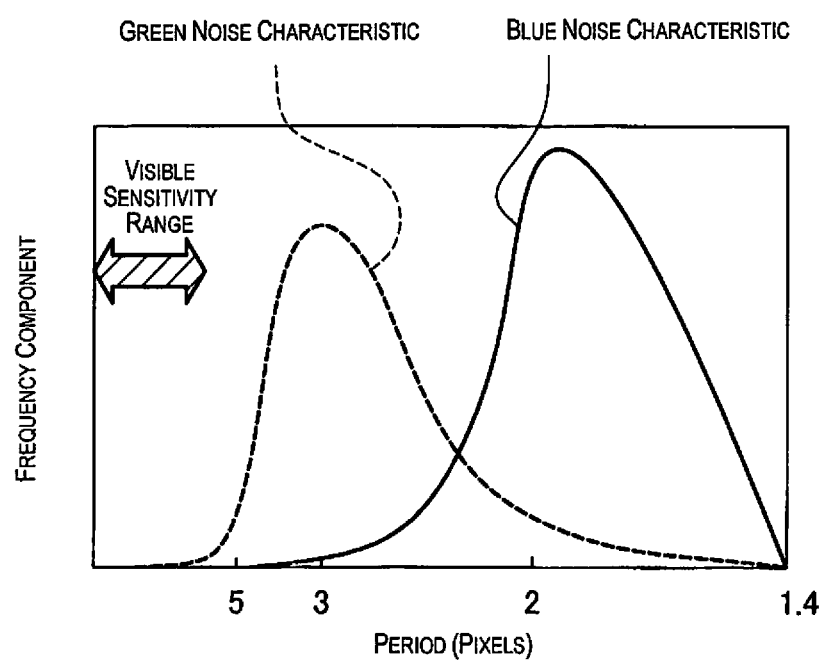
FIG. 5 is a descriptive view illustratively exemplifying a noise characteristic with which the dither mask 61 used in the embodiment is endowed.

FIG. 5 is a descriptive view illustratively exemplifying the blue noise characteristic with which the dither mask 61 is endowed. The drawing conceptually illustrates an example of a spatial frequency characteristic of threshold values that have been set for each of the pixels in dither masks that have a blue noise characteristic and a green noise characteristic. The blue noise characteristic in the dither mask is one that has the largest frequency component in a higher frequency region, where the length of one cycle is close to two pixels. This signifies that the storage positions of the threshold values have been adjusted so that the largest frequency component is generated in the high-frequency region, with consideration given to the visual perception characteristics of humans, who are less sensitive in the high-frequency region. When the dots are generated using the dither mask endowed with this blue noise characteristic, an image having excellent dispersion of dots is obtained.

FIG. 5 illustratively exemplifies the green noise characteristic as a dashed curve. As is depicted, the green noise characteristic is one that has the largest frequency component at a somewhat lower frequency than the blue noise characteristic; provided that the pixel size is sufficiently small, a favorable image free of any perceived graininess is obtained with the green noise characteristic, as well. The dither mask 61 is understood to be one that has a predetermined spatial frequency characteristic, such as this blue noise characteristic or green noise characteristic.

Moreover, in the present embodiment, the dither mask 61 has the following dot formation characteristic. Namely, a dot pattern of a dot group formed in forward movement of a carriage 80 in bidirectional printing, a dot pattern of a dot group formed in return movement, and a dot pattern of an overall dot group combining these together all have a characteristic close to a blue noise characteristic. Such a technique has been disclosed in, for example, patent document 1 or Japanese laid-open patent publication 2007-15359. The size and characteristic of the dither mask 61 are optional, however, and it would be possible to use one of a size or characteristic other than the present working example. For example, the dither mask may have a size of 64×32 or greater in order to realize ordered dithering, or may be a concentrated-dot dither mask for realizing a characteristic close to halftone dots.

The error diffusion threshold value table 62 stored in the EEPROM 60 is a table that stores high threshold values and low threshold values used in the determination of ON/OFF for dots in an error diffusion method. The role of these threshold values shall be described in greater detail below.

A memory card slot 98 is connected to the control unit 30, and image data ORG can be read in and inputted from a memory card MC that has been inserted into the memory card slot 98. In the present working example, the image data ORG inputted from the memory card MC is data composed of color components for the three colors red (R), green (G), and blue (B).

The printer 20 having the hardware configuration as above drives the printing head 90 while also causing the printing medium P to move in the direction of feeding thereof by driving the paper feeding motor 74, and forms ink dots of each of the colors on the printing medium P. The control unit 30 form ink dots of the appropriate color at the appropriate position on the printing medium P by driving the nozzles at the appropriate timing on the basis of the printing data, in conjunction with the feeding of the printing medium P. So doing makes it possible for the printer 20 to print a color image that has been inputted from the memory card MC onto the printing medium P.

Figure 2:
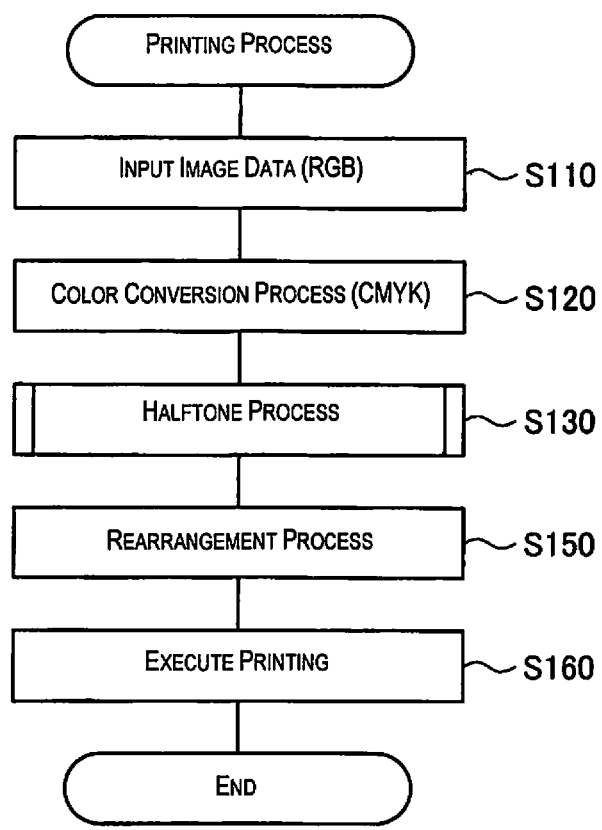
FIG. 2 is a flow chart illustrating the flow of a printing process in a printer 20.

A-2. Printing Process:

The printing process in the printer 20 shall now be described. FIG. 2 is a flow chart illustrating the flow of the printing process in the printer 20. The printing process herein is started by when a user uses the operation panel 99 or the like to carry out an operation to instruct printing of a predetermined image stored on the memory card MC. When the printing process is being started, the CPU 40 first reads in and inputs the image data ORG of the RGB format, which is the printing target, from the memory card MC via the memory card slot 98, as the process of the input unit 41 (step S110).

When the image data ORG is being inputted, the CPU 40 consults a look-up table (not shown) that is stored in the EEPROM 60 and runs the image data ORG through a color conversion from the RGB format to a CMYKLcLm format (step S120).

When this color conversion process is being carried out, the CPU 40 carries out a halftone process for converting the image data into dot data that establishes for every pixel the ON/OFF of dots of each of the colors, as the process of the halftone processing unit 42 (step S130). This halftone processing shall be described in greater detail below. In the present specification, the "halftone process" is not limited to binarization processes for the ON/OFF of dots but rather signifies gradation number conversion (reduction) processes that include multi-value conversion processes in general, such as the ON/OFF of large and small dots, or of large, medium, and small dots, or the like. The image data subjected to step S130 also may have undergone image processing such as resolution conversion processing or smoothing processing.

When the halftone process is carried out the CPU 40 carries out the rearrangement process, for rearrangement to dot pattern data where the respective nozzles of the printing head 90 are driven at the same time, in conformity with the nozzle arrangement of the printer 20, the paper feed amount, and the like (step S150). The rearrangement process, as described above, is a process where the dot data obtained by the halftone process (step S130) is rearranged in conformity with the arrangement of the nozzles Nz in the printing head 90. After the rearrangement process (step S150) has been carried out, the CPU 40 drives the printing head 90, the motor 74, and the like and executes printing, as the process of the print unit 46 (step S160).

A-3. Halftone Process, in Greater Detail:

The aforementioned halftone process (step S130) shall now be described in greater detail, with reference to FIG. 3. As is depicted, when this process is being started, the CPU 40, the CPU 40 first acquires coordinate data n (x, y) about a target pixel position, and acquires a target pixel data Dn, with respect to the image data that underwent the color conversion process in step S120 (step S131). The target pixel position starts at an origin point (upper left) of the image, and moves by one-pixel increments in a main scanning direction (x-direction) every time the following process is repeated. Upon reaching the right end of the image in the main scanning direction, the target pixel position moves over one in a secondary scanning direction (y-direction), and resumes moving in the main scanning direction from the left end in the x-direction. In the description that follows, the coordinate data of the target pixel position shall be represented as n(x, y), but where used as a subscript indicative of the target pixel position, the notation shall be (x, y) directly.

When the coordinate data n(x, y) of the target pixel position and the target pixel data Dn are acquired, then the CPU 40 carries out a tentative dithering process, as the process of the comparison unit 43 (step S132). This "tentative dithering process" is a process for comparing the relationship of magnitude between a gradation value of the target pixel data Dn and a threshold value THn_d corresponding to coordinates (x, y) of the target pixel out of the plurality of threshold values constituting the dither mask 61 stored in the EEPROM 60. This process is formally the same process as a process for determining the ON/OFF of a dot by dithering as is usually carried out. In usual dithering, a dot is determined to be ON in a case where the gradation value of the target pixel data Dn is not less than the value of the threshold value THn_d, and a dot is determined to be OFF in a case where the gradation value of the target pixel data Dn is less than the value of the threshold value THn_d. By contrast, the tentative dithering process of the present working example differs in being a pre-process for deciding the ON/OFF of a dot by an error diffusion method described below, and more specifically in being a process for deciding the threshold value of the error diffusion method.

Where the result of the tentative dithering process is that the gradation value of the target pixel data Dn is not less than the value of the threshold value THn_d (step S132: YES), then a threshold value THe used in the error diffusion method is set to a low threshold value THe_L (step S133). In turn, where the gradation value of the target pixel data Dn is less than the value of the threshold value THn_d (step S132: NO), then the threshold value THe used for the error diffusion method is set to a high threshold value THe_H (step S134). In this manner, the present working example takes a configuration where the threshold value THe used in the error diffusion method (hereinbelow also simply called a threshold value THe) is changed on the basis of the result of the tentative dithering process. The threshold value THe is set by consulting the error diffusion threshold value table 62 stored in the EEPROM 60.

Figure 6:
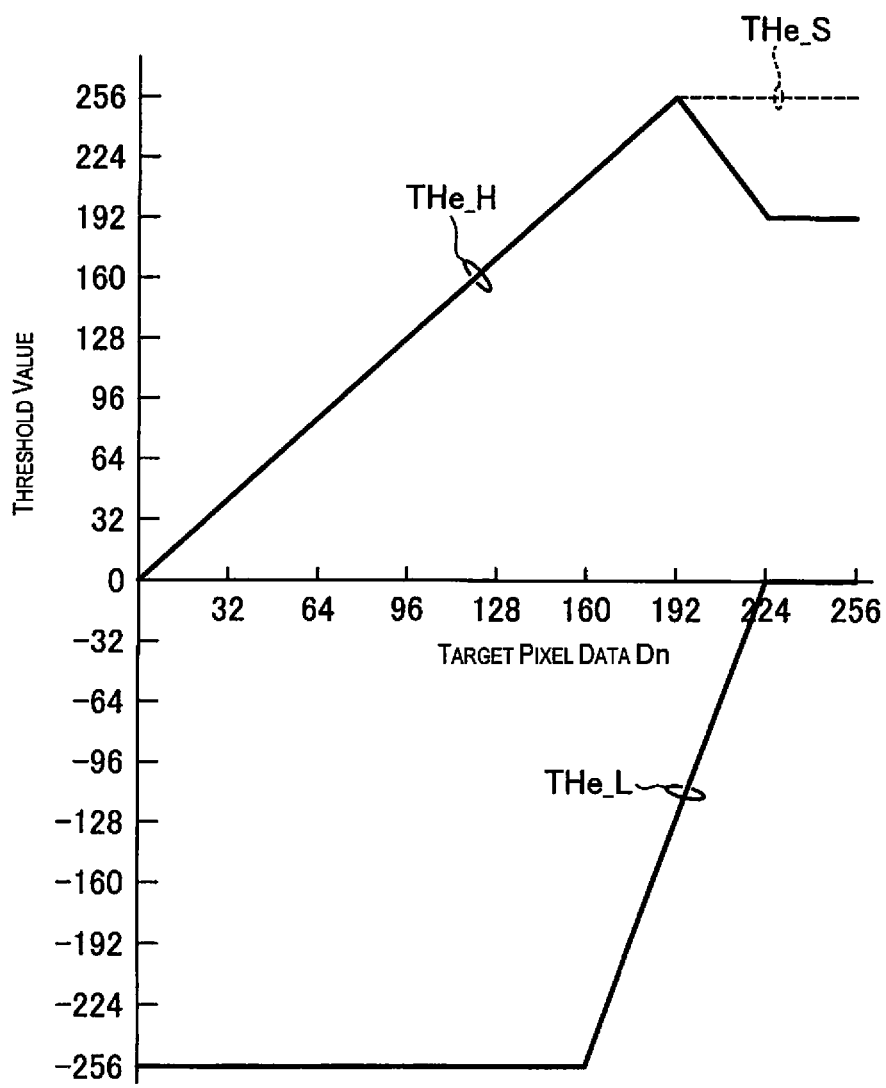
FIG. 6 is a graph illustrating a relationship between a high-pass-side threshold value THe_H and low-pass-side threshold value THe_L and target pixel data Dn in the first embodiment.

FIG. 6 illustrates one example of the error diffusion threshold value table 62, in the form of a graph. As is depicted, in the error diffusion threshold value table 62, each value for the target pixel data Dn (which herein is 0 to 255) is associated with a low threshold value THe_L and a high threshold value THe_H. In the example illustrated in FIG. 6, the high threshold value THe_H takes a value 0 in a case where the gradation value of the target pixel data Dn is 0, but increases as the gradation value increases from 0, ultimately reaching a maximum value of 256 in a case where the gradation value is 192. When the target pixel data Dn is a higher gradation, furthermore, the high threshold value THe_H has a gradually reducing value, decreasing to the point of reaching a value of 192 when the gradation value of the target pixel data Dn is 224. In the range of higher gradation values than this one, the high threshold value THe_H is maintained at the same value.

Meanwhile, in the range where the gradation value of the target pixel data Dn is 0 to 160, the low threshold value THe_L is fixed to −256, a smaller value than a value of 0, which is the lower limit of the gradation range of the target pixel data (0 to 255), irrespective of the magnitude of the gradation value. In the range where the gradation value of the target pixel data Dn is 160 to 224, the low threshold value THe_L increases from −256 to a value of 0, and is thereafter maintained at the same value 0.

The CPU 40 consults the error diffusion threshold value table 62, acquires either the high threshold value THe_H or the low threshold value THe_L, and uses the acquired value for the setting in step S133 or S134. The present working example takes a configuration where the error diffusion threshold value table 62 is consulted and thereby a high threshold value THe_H or low threshold value THe_L corresponding to the gradation value is set, but the values may be found by a mathematical function.

Figure 3:
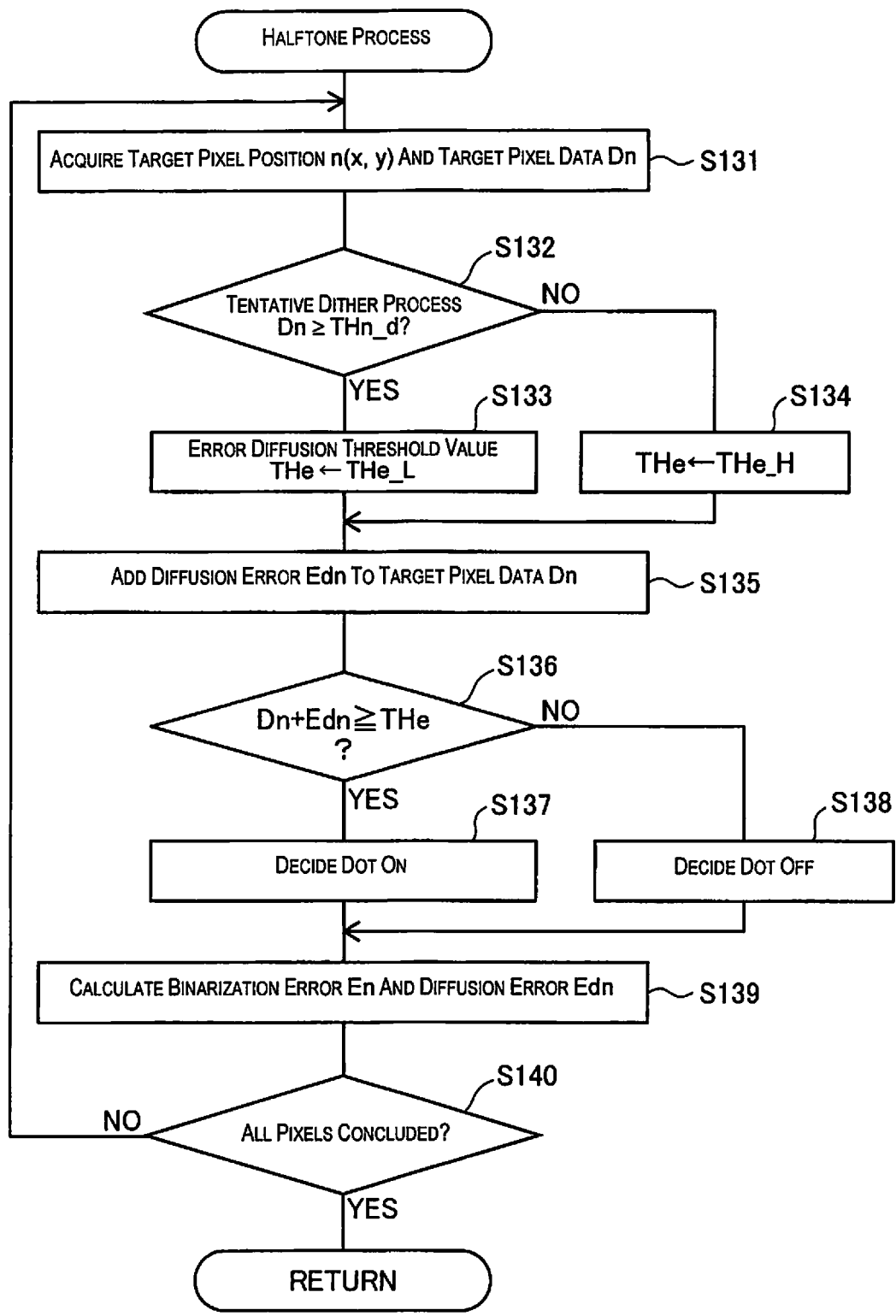
FIG. 3 is a flow chart illustratively exemplifying a halftone process in a first embodiment.

In step S137 or S138 in FIG. 3 described above, when the error diffusion threshold value table 62 is consulted and the threshold value THe is set, the CPU 40 adds to the gradation value of the target pixel data Dn a diffusion error Edn stored in an error buffer that is prepared separately (step S135). The diffusion error Edn is one that has been calculated in a step S139 described below, and the content thereof shall be described below.

When adding the diffusion error Edn to the gradation value of the target pixel data Dn, the CPU 40 compares the gradation value of the target pixel data Dn to which the diffusion error Edn has been added (hereinafter also called "correction data") and the threshold value THe that was set in step S133 or step S134 (step S136). Where the result thereof is that the correction data (Dn+Edn) is not less than the threshold value THe (step S136: YES), then a decision is made that the dot data of the target pixel is ON (a dot shall be formed) (step S137). In turn, where the gradation value of the target pixel data Dn to which the diffusion error Edn has been added is less than the threshold value THe (step S136: NO), then a decision is made that the dot data of the target pixel is OFF (a dot shall not be formed) (step S138).

When deciding the ON/OFF of the dot, the CPU 40 calculates a binarization error En and the diffusion error Edn (step S139). The "binarization error En" is the difference between the correction data and a gradation value RSLT (which herein is a value 255 or 0) that is realized as a result of the ON/OFF of the dot. Expressed as a mathematical formula, this gives the following formula (1).

$$En = \{Dn(x, y) + Edn(x, y)\} - RSLT(255 \text{ or } 0) \quad (1)$$

Often, when a dot is not formed, the binarization error En takes a positive value, and where a dot is formed, the binarization error takes a negative value. However, depending on the value of the diffusion error Edn as accumulated, it can sometimes happen, though seldom, that the opposite result will occur.

Figure 7A:
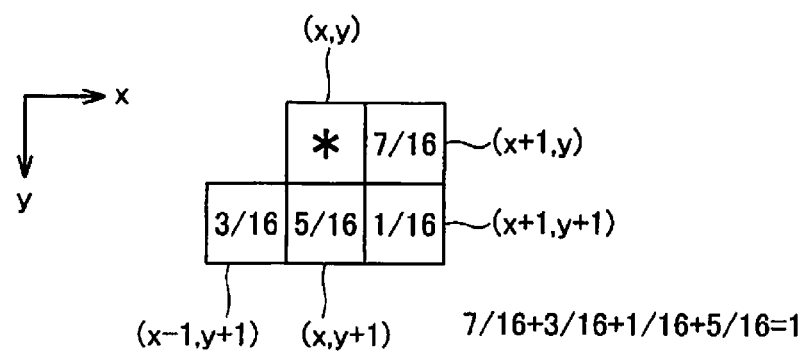
FIGS. 7A and 7B are descriptive views illustratively exemplifying error diffusion ranges and weighting.

As a result, due to the process of error diffusion that shall be described below, a dot is less likely to be formed in the surrounding pixels when a dot is formed by the process of binarization, and a dot is more likely to be formed in the surrounding pixels when a dot is not formed. The error diffusion is a process for finding the diffusion error Edn by the following formulae (2) and allocating the error generated in the target pixel to the surrounding pixels. The error that has been allocated is accumulated, and is added to the gradation value of the target pixel data Dn in the aforementioned step S135. In the present embodiment, as shown in FIG. 7A, the binarization error En is allocated to four pixels, which are the surrounding pixels, for which the ON/OFF of the dot has not yet been decided. Namely, the allocation as the diffusion error Edn is understood to be at a proportion of 7/16 for the pixel to the right of the target pixel, 3/16 for the pixel to the lower left, 5/16 for the pixel below, and 1/16 for the pixel to the lower right. The diffusion error Edn thus calculated is stored in the error buffer that has been prepared in the RAM 52.

$$Edn(x+1, Y) = Edn(x+1, y) + En \times (7/16)$$

$$Edn(x-1, Y+1) = Edn(x-1, y+1) + En \times (3/16)$$

$$Edn(x, Y+1) = Edn(x, y+1) + En \times (5/16)$$

$$Edn(x+1, Y+1) = Edn(x+1, y+1) + En \times (1/16) \quad (2)$$

The process of steps S135 to S139 is a halftone process by the error diffusion method, and is executed as the process of the error diffusion unit 44. The error diffusion method is a well-known technique and therefore a more detailed description shall be omitted here, but the approach is to compare respective image data and a predetermined threshold value and quantize the respective image data, while also adding the quantization error of the respective image data at a predetermined allocation ratio to the surrounding image data. In the example described above, the steps S135 to S139 are understood to be a binarization process for deciding solely the ON/OFF of the dot, but a multi-value conversion process may also be carried out, such as deciding the ON/OFF for a large dot and for a small dot.

When calculating the binarization error En and the diffusion error Edn, the CPU 40 determines whether the aforementioned process has been completed as regards all of the pixels (step S140), and repeats the process of the steps S131 to S139 while also incrementing the target pixel position (x, y) until the process is concluded for all of the pixels. In this manner, the halftone process of step S130 is concluded.

A-4. Effects of the First Embodiment:

Effects of implementing this halftone process shall be described below. As stated above, in the process of steps S132 to S134, where the gradation value of the target pixel data Dn is not less than the value of the threshold value THn_d, then the threshold value THe used in the error diffusion method is set to the low threshold value THe_L. In turn, where the gradation value of the target pixel data Dn is less than the value of the threshold value THn_d, then the threshold value THe is set to the high threshold value THe_H.

As a result of this, the result of generation of dot data by the error diffusion method is understood to be one strongly reflective of the result of determination using the dither mask 61. In particular, because the high threshold value THe_H and the low threshold value THe_L are established as per FIG. 6, the dots are formed in the following manner.

(1) In a case where the low threshold value THe_L has been set as the threshold value THe for error diffusion due to determination of the tentative dither, then where the gradation value of the target pixel data Dn is 224 or lower, the determination in FIG. 3, step S136 will be "YES" in nearly all cases, even considering the diffusion error from the surrounding pixels, and therefore a dot will be formed and the result of determination of the tentative dither will be reflected without change.

(2) In a case where the high threshold value THe_H has been set as the threshold value THe for the error diffusion due to the determination of the tentative dither, however, then where the gradation value of the target pixel data Dn is 192 or lower, the high threshold value THe_H will be compared with the correction data Dn+Edn to which the diffusion error from the surrounding pixels has been added; dot formation or the absence thereof will be determined while the result of the tentative dither is being reflected to a certain extent and while the influence of the diffusion error diffused from the surrounding pixels that have already undergone the halftone process is being received. For this reason, it is possible to take full advantage of the error diffusion while using the characteristic of the dither mask 61 as the basis thereof.

Figure 8:
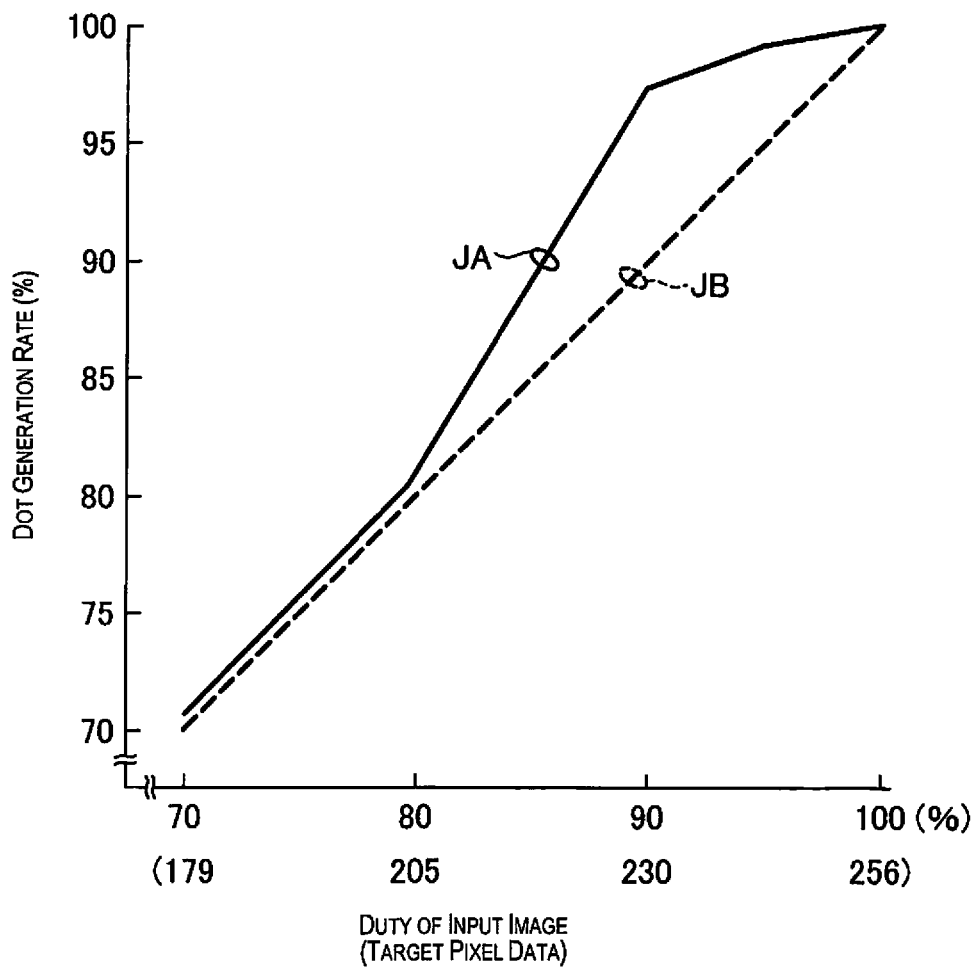
FIG. 8 is a graph illustrating a relationship between the duty of an input image and a dot generation rate for a case where the first embodiment has been applied.

(3) Moreover, in the first embodiment, as illustrated in FIG. 6, the high threshold value THe_H increases monotonically until when the gradation value of the target pixel data Dn is 192; when the gradation value exceeds 192, the high threshold value THe_H gradually decreases from the maximum value, and attains a constant value (which is 192 in the present embodiment) when the gradation value is 224 or higher. As a result of this, when the gradation value of the target pixel data Dn exceeds a value of 192, a dot will be more likely to be formed than the case where the high threshold value THe_H is not decreased gradually. These circumstances are illustrated in FIG. 8. In FIG. 8, the solid line JA illustrates the dot generation rate of a case where the high threshold values THe_H illustrated in FIG. 6 are used, and the dashed line JB illustrates the dot generation rate of a case where the high threshold value at a gradation value 192 or higher is set, as per the dashed line THe_S in FIG. 6.

Figure 4:
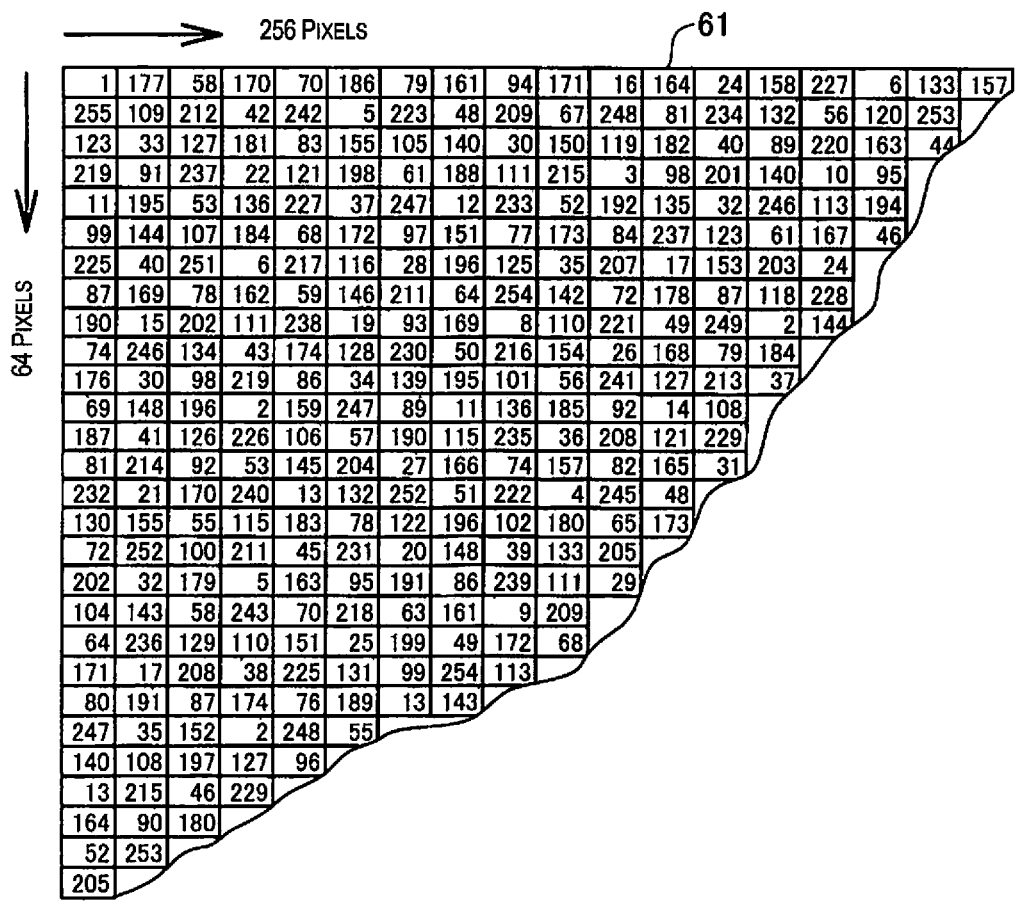
FIG. 4 is a descriptive view illustratively exemplifying a dither mask 61 that is used in the embodiment.

In the light of FIGS. 6 and 8, it will be readily understood that in a region where the gradation value of the target pixel data Dn is high, the high threshold value THe_H will be lowered from the maximum value, and therefore a dot becomes more likely to be formed in the determination by the error diffusion method realized by steps S135 to S139 in FIG. 4 than a case where the high threshold value THe_H is maintained at the maximum value (FIG. 6, the threshold value THe_S). The value is set to the threshold value THe and the high threshold value THe_H will be low even when the diffusion error Edn has become negative, in response to the diffusion of error that arises due to the formation of a dot, and therefore the determination that $$Dn+Edn \geq THe$$

is less likely to be "NO".

Figure 9A:
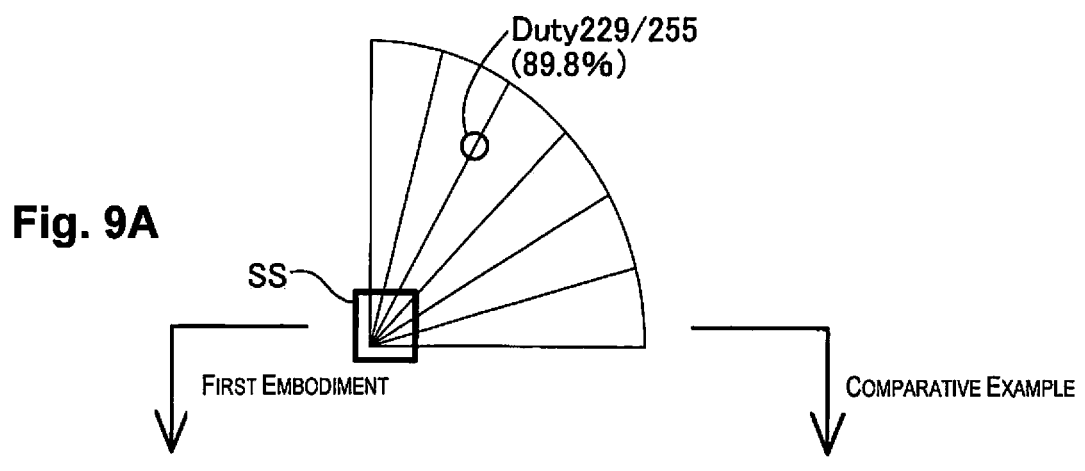
FIGS. 9A, 9B and 9C are descriptive views illustrating one example of the display of fine lines in a case where the first embodiment has been applied.
Figure 9B:
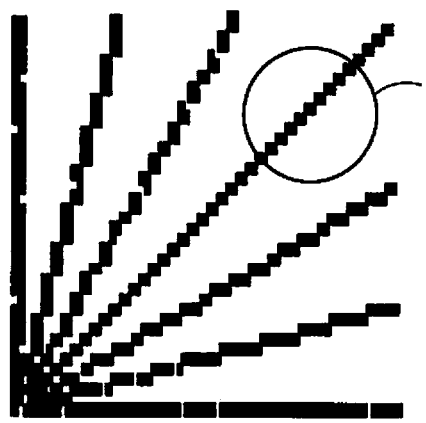
Figure 9C:
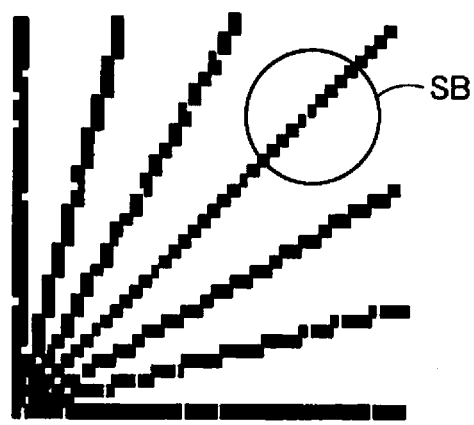

As a result of this, the present embodiment exhibits the effect where missing dots in a case where fine lines or characters are being rendered are suppressed. These circumstances are illustrated in FIGS. 9 and 10. FIGS. 9A, 9B and 9C are descriptive views which describe the formation of fine lines. FIG. 9A illustrates an original view in which a variety of oblique lines are drawn as original image data. These fine lines are designated in the color black in a case of drawing by application software, with a gradation value of 255 and ink duty of 100%, but the gradation value of when the halftone process is performed is 229/255. This is because a characteristic caused by the state of ink discharge for every printing head 90 is corrected. It shall be readily understood that this also applies to a case where the gradation value is about 190 to less than 255 without such a correction. FIG. 9B illustrates the result of a case where the fine lines (image SS) of this gradation range have undergone the halftone process with the approach of the first embodiment. FIG. 9C, then, illustrates an example where same has been processed with a conventional approach (a case where the high gradation values in FIG. 6 are taken to be THe_S).

As is depicted, even in the case of an image such as where, as with the fine lines, the duty of the portions drawn is high to a certain extent (229/255 in the example in FIG. 9) and only a width of one dot or two dots is maintained, missing dots are less likely to occur and the reproducibility of the oblique fine lines can be raised according to the present embodiment, as illustrated in FIG. 9B. In the case of such fine lines, when the high threshold value is placed at a maximum value at a predetermined gradation value or higher (FIG. 6, the threshold value THe_S), then the diffusion error (which herein is a negative error) caused by when one dot is set to ON is diffused to the surrounding pixels, and a missing dot may sometimes take place, as per the region illustrated as "SB" in FIG. 9C. By contrast, in the present embodiment, the occurrence of missing dots is suppressed and the reproducibility of the fine lines is suitably maintained, as is illustrated as "SA" in FIG. 9B.

Also, it is understood that missing dots are less likely to occur even with characters (referring in FIG. 10 to the character "9"), as illustrated in FIG. 10A. A character, as with a thin line, has a narrow solid region that is filled in at the same density, and in a region where the duty is high, the influence of the diffusion error (EdN) causes missing dots to be more likely to occur. As illustrated in FIG. 10, the high threshold value THe_H will have been set so as to be a lower value from the maximum value where the high threshold value THe_H is not less than a predetermined gradation value, according to the process of the first embodiment, and therefore missing dots are less likely to occur in the printing of a character that has been rendered in such a range of gradation values. FIG. 10B illustrates an example of printing of a character in a case of processing in the first embodiment, and FIG. 10C illustrates an example of printing of a character in a case of processing with a conventional approach (an approach where the high threshold value is taken to be the THe_S of FIG. 6). As illustrated as the regions TA and TB in FIGS. 10B and 10C, respectively, it is understood that missing dots and the like are less likely to take place according to the present embodiment, as compared to a comparative example.

According to the present embodiment, as has been described above, there is less likely to arise the problem where missing dots occur and the image quality decreases, as with fine lines, characters, or the like, in a region of high gradation values. At this time, the halftone process illustrated in FIG. 3 absolutely will not make the determination of whether the subject of processing is a line graphic or character, or is a natural image such as a photographic image. The same halftone process (FIG. 3) is implemented whether a transition is made from a region of line graphics without change to a region of a natural image, or whether line graphics or characters are present within a natural image. As a result thereof, in regions of line graphics or characters, it is possible to form an image with which missing dots have been suppressed even while dots are being formed by the error diffusion method, and in regions of natural images, it is possible to generates dots caused by the characteristic possessed by the dither mask 61 (for example, the blue noise characteristic) due to the dithering. For this reason, it is abundantly possible to maintain image quality, including the graininess in bidirectional printing, irrespective of the characteristic of the image intended to be printed.

Also, the present embodiment uses a value that increases in accordance with the gradation value of the target pixel data, as illustrated in FIG. 6, as the threshold value that is used during the error diffusion method (the high threshold value THeH), and therefore tailing and other such phenomena, as disclosed in Japanese Patent No. 3360391 (patent document 3), shall not occur. Moreover, carrying out a process for replacing the error diffusion range illustrated in FIG. 7 in accordance with the gradation value of the target pixel data has the potential to further enhance the image quality. The approach of carrying out error diffusion while also replacing the diffusion range is a well-known technique, and therefore a more detailed description is omitted here, but a variety of effects would be achieved when the error diffusion range is replaced in accordance with the combination of the input gradation value and binarization result. For example, having a wide-ranging error diffusion only when there is dot ON with a low gradation value could improve the graininess of low-gradation regions and suppress the occurrence of so-called worms, an undesired continuity of dots.

A-5. Modification Examples:

In the first embodiment, the high threshold value THe_H and the low threshold value THe_L were set as is illustrated in FIG. 6, but it shall be readily understood that the two set values are not limited thereto. It suffices for the high threshold value THe_H to be established so as to be not less than the maximum value of the gradation value of the pixel data where the gradation value of the pixel data is not less than a predetermined value, and so as to be smaller than this maximum value where the gradation value of the pixel data is within a predetermined gradation range not less than the predetermined value. To be "not less than a maximum value" or "a maximum value or higher/greater", it suffices, for example, to be a value not less than the maximum value of 255 in the case where the pixel data Dn is expressed in eight bits. In a case where a value exceeding 255 is taken, it suffices to express the high threshold value THe_H in a number of bits greater than eight bits. It shall be readily understood that the pixel data may also be expressed in a number of bits other than eight bits.

Figure 11:
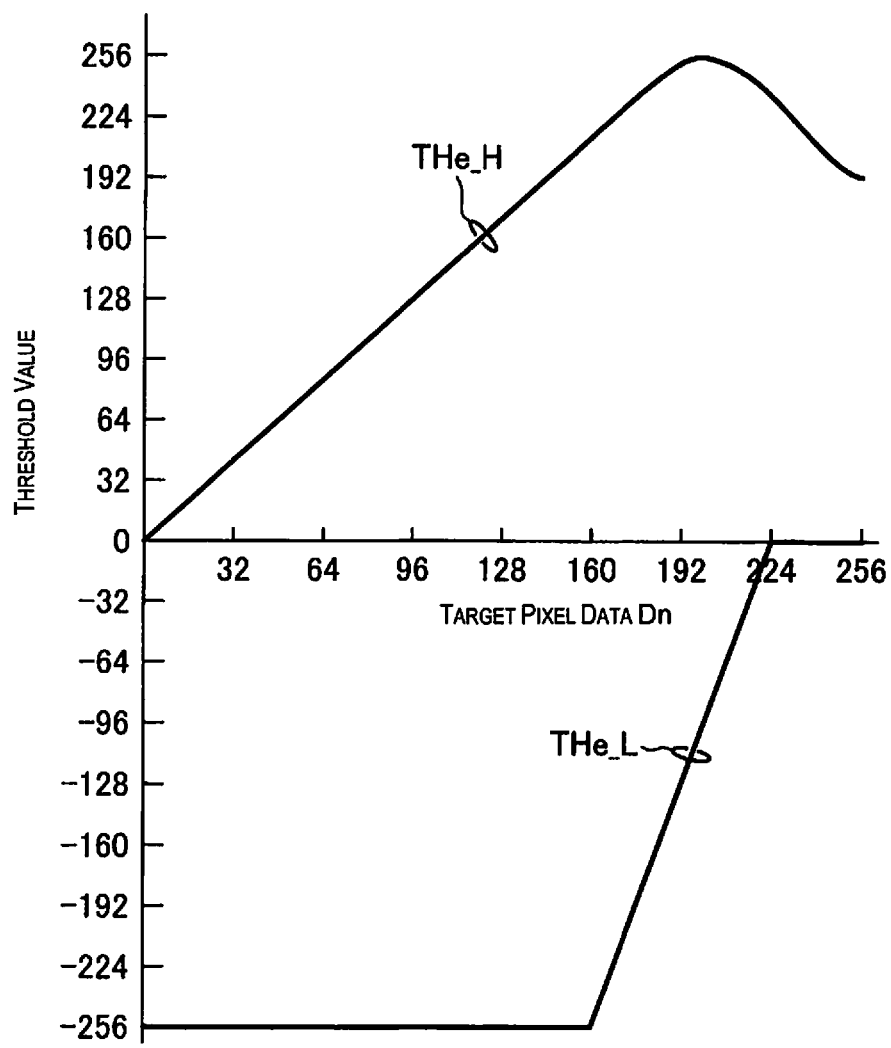
FIG. 11 is a graph illustrating a relationship between the high-pass-side threshold value THe_H and low-pass-side threshold value THe_L and the target pixel data Dn in a modification example of the first embodiment.

As an example, the high threshold value THe_H may have such a relationship as is illustrated in FIG. 11. In the example illustrated in FIG. 11, the high threshold value THe_H is set to a value that decreases monotonically, with no inflection point, at not less than a gradation value understood to be not less than the maximum value of the gradation value of the pixel data. The low threshold value THe_L does not necessarily need to be a value that is the minimum value of the gradation value or below, and may be set in any manner, provided that the low threshold value THe_L is a lower value than the high threshold value THe_H.

Figure 7B:
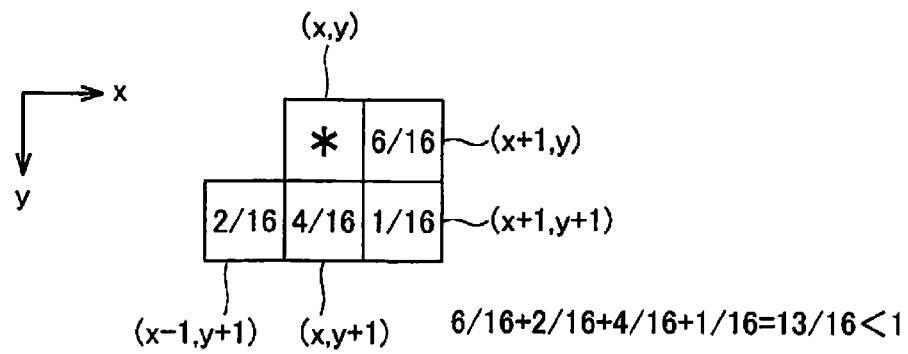

In the first embodiment, the range of diffusion of error by the error diffusion was understood to be the surrounding four pixels of the target pixel, as illustrated in FIG. 7, but may also be understood to be a range wider or narrower than this. The determination of the diffusion may also be modified in accordance with the gradation value of the target pixel. For example, in terms of improving the graininess in a low-gradation area, it would also be suitable to have the configuration be such that the lower the gradation value, the wider the range of diffusion. It would also be desirable to have the sum of weighting of differences undergoing error diffusion be a value not greater than 1, as illustrated in FIG. 7B. In the example illustrated in FIG. 7B, the density error arising in the target pixel is diffused at a proportions of 6/16, 2/16, 4/16, and 1/16 to the surrounding four pixels, and the sum thereof is understood to be 13/16 of the resulting error. As a result of this, the impact on the surrounding pixels from the density error caused by the error diffusion is mitigated, and missing dots are even less likely to occur, as regards the examples illustrated in FIGS. 9 and 10. Conversely, in a low-density region, once a dot is formed, a dot is less likely to be formed in the periphery thereof.

Figure 12:
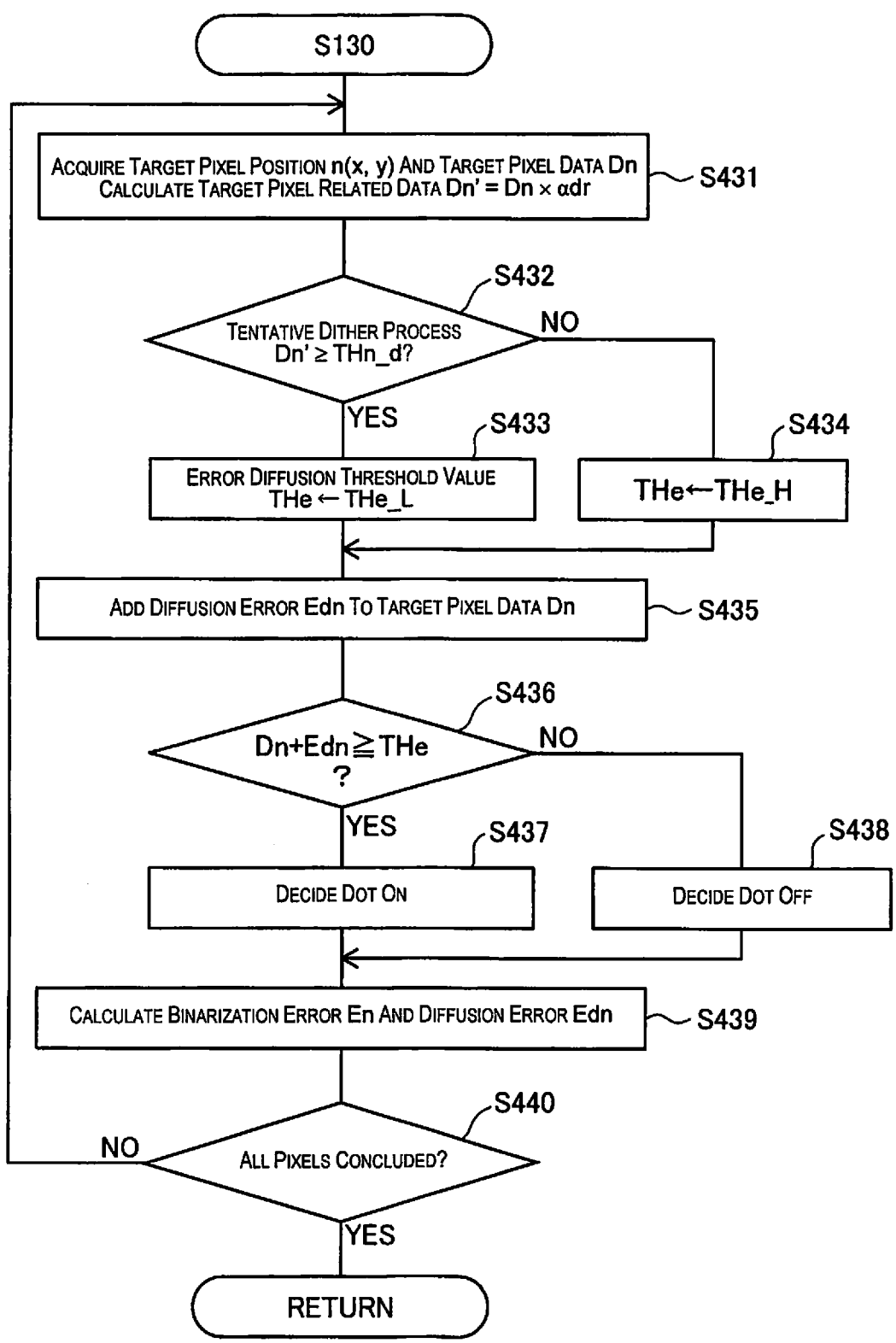
FIG. 12 is a flow chart illustratively exemplifying a halftone process in a second embodiment.

B. Second Embodiment:

Next, a second embodiment of the present invention shall be described. A printer 20 of the second embodiment is provided with the same hardware configuration as that of the first embodiment, and executes the same printing process (FIG. 2). The manner in which the printer 20 of the second embodiment is unlike the first embodiment resides in the halftone process thereof. FIG. 12 illustrates the halftone process executed by the printer 20 of the second embodiment. The halftone process executed by the printer 20 of the second embodiment differs from the first embodiment only in terms of steps 431, 432, which shall be described below; the other steps S433 to S440 are the same as the steps S133 to S140 of the first embodiment.

In the second embodiment, when starting the halftone process, the CPU 40 first acquires the coordinate data n(x, y) of the target pixel position as well as the target pixel data Dn, and carries out a process for finding a value Dn' that is obtained by multiplying the gradation value of the target pixel data Dn by a predetermined factor αdr (0<αdr≤1) (step S431). The data thus calculated is a gradation value associated with the gradation value of the target pixel data Dn, and therefore is also called related data Dn' (Dn'=Dn×αdr). In the present working example, the factor α is taken to be=0.9.

When calculating the related data Dn', the CPU 40 carries out the tentative dithering process, as the process of the comparison unit 43 (step S432). The difference from the tentative dithering process of step S132 illustrated in FIG. 3 resides in the fact that the related data Dn' and the threshold value THn_d of the dither mask 61 are compared, instead of comparing the gradation value of the target pixel data Dn and the threshold value THn_d.

As a result thereof, where the related data Dn' is not less than the value of the threshold value THn_d (step S432: YES), the threshold value THe used in the error diffusion method is set to the low threshold value THe_L (step S433). Where the related data Dn' is less than the value of the threshold value THn_d (step S432: NO), however, the threshold value THe used for the error diffusion method is set to the high threshold value THe_H (step S434). The high threshold value THe_H and low threshold value THe_L set at this time use the same threshold values as what is illustratively exemplified in FIG. 6 of the first embodiment. The process of the error diffusion method thereafter (the steps S435 to S439) is similar to in the first working example, and therefore a description shall be omitted here. The ON/OFF of the dots in the error diffusion method is determined using the gradation value of the target pixel data Dn, not the related data Dn'.

In the present embodiment, the factor αdr is understood to =0.9, and therefore the proportion at which a determination is made to generate a dot due to the determination of the tentative dither is kept to 90% of the normal determination described in the first embodiment and elsewhere. As a result of this, a deficit of 10% will be generated with the determination of the error diffusion method (step S436). So doing makes it possible to arbitrarily set the ratio between the dots generated with the determination by dithering and the dots generated by the determination by the error diffusion method, in a manner that supplements same. Moreover, because the high threshold value THe_H has been set to a value lower than the maximum value at not less than the predetermined gradation value, as illustrated in FIG. 6, a dot will be more likely to be formed by the determination of the error diffusion method in this gradation range. For this reason, the problem of missing dots in line graphics and characters is avoided, as illustrated in the first embodiment.

In the second embodiment, the factor αdr can be set arbitrarily between 0 and 1.0, and therefore it is possible to properly set the sum total of dots generated with the determination by dithering and the dots generated with the determination by the error diffusion method. For example, where the factor αdr is understood to be=1, the configuration would be the same as the first embodiment, but in such a case, dots due to the error diffusion method are generated in addition to the dots generated with the determination by the dithering. As such, in such a case, there may be some instances where the dots are formed in somewhat greater abundance than the density of the original image (see FIG. 8). By contrast, when the factor αdr is set to a value somewhat lower than 1.0, such as 0.9, as with the second working example, then there will be slightly fewer dots generated by the determination of the tentative dither, and therefore it is possible to have the shortfall be generated with the determination by the error diffusion method, only with what is necessary and sufficient. It becomes possible to better match the gradation value rendered by the dots generated in total to the gradation of the original image.

Moreover, provided that the factor αdr is set to a function of the target pixel data Dn, it would also be possible to set, to an arbitrary ratio, the proportion of dots generated by the dithering in accordance with the gradation value. Should there be a gradation value at which the generation of dots is determined at a high proportion, with the default value of the factor αdr having been set to 1, then the proportion of dot generation can be rendered more uniform when the factor αdr is slightly reduced at near the gradation of the target pixel data thereof. In a case where the factor αdr is changed in accordance with the gradation value, then it would be more preferably to increase gradually and decrease gradually, thus causing the proportion of dot generation to have smooth changes.

Figure 13:
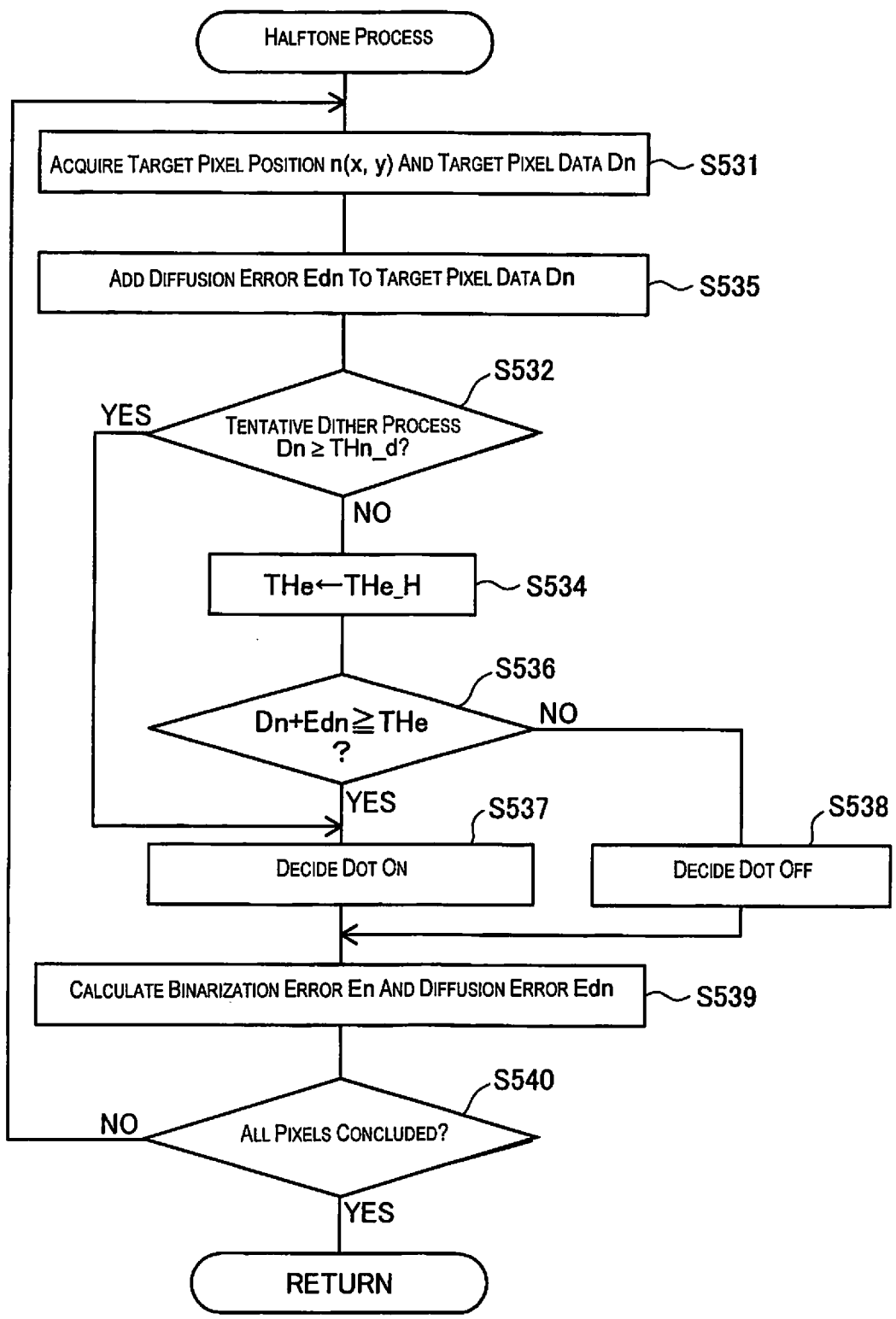
FIG. 13 is a flow chart illustratively exemplifying a halftone process in a third embodiment.

C. Third Embodiment:

Next, a third embodiment of the present invention shall be described. A printer 20 of the third embodiment is provided with the same hardware configuration as that of the first embodiment, and executes the same printing process (FIG. 2). The manner in which the printer 20 of the third embodiment is unlike the first embodiment resides in the halftone process thereof. FIG. 13 illustrates the halftone process executed by the printer 20 of the third embodiment. Though the processes of each of the steps are substantially the same as the first embodiment, the halftone process executed by the printer 20 of the third embodiment differs therefrom in the order of the processes. In FIG. 13, processes that are the same as in FIG. 3 have the same last two digits of the step.

In the third embodiment, when starting the halftone process, the CPU 40 first acquires the coordinate data n(x, y) about the target pixel position, as well as the target pixel data Dn (step S531). Next, the CPU 40 adds the diffusion error Edn stored in the separately prepared error buffer to the gradation value of the target pixel data Dn (step S535). The diffusion error Edn is one that is calculated in a step S539, described below. The value found by adding the diffusion error Edn to the gradation value of the target pixel data Dn is also called the correction data, similarly to the other embodiments.

Next, the tentative dithering process is carried out, similarly to the first embodiment, as the process of the comparison unit 43 (step S532). This "tentative dithering process" is a process for comparing the relationship of magnitude between the gradation value of the target pixel data Dn and the value of the threshold value THn_d corresponding to the coordinates (x, y) of the target pixel out of the plurality of threshold values constituting the dither mask 61 stored in the EEPROM 60.

Where the result of the tentative dithering process is that the gradation value of the target pixel data Dn is less than the value of the threshold value THn_d (step S532: NO), then the threshold value THe used in the error diffusion method is set to the high threshold value THe_H (step S534). The high threshold value THe_H used herein is the same one as the high threshold value THe_H described in the first embodiment (see FIGS. 6 and 11). After the threshold value THe has been set, the CPU 40 compares the correction data found in step S535 and the threshold value THe (step S536). Where the result thereof is that the correction data (Dn+Edn) is not less than the threshold value THe (step S536: YES), the dot of the target pixel is decided to be ON (a dot shall be formed) (step S537); where the gradation value of the correction data is less than the threshold value THe (step S536: NO), the dot of the target pixel is determined to be OFF (a dot shall not be formed) (step S538).

In turn, where the gradation value of the target pixel data Dn is not less than the value of the threshold value THn_d in the determination of the tentative dither in step S532 (step S532: YES), then the dot is decided to be ON (step S537), similarly to the case where the correction data (Dn+Edn) is not less than the threshold value THe (step S536: YES).

When deciding the ON/OFF of the dot in this manner, the CPU 40 calculates the binarization error En and the diffusion error Edn (step S539). The calculation of the binarization error En and the diffusion error Edn has been described in detail in the first embodiment, and therefore a description thereof is omitted here.

When calculating the binarization error En and the diffusion error Edn, the CPU 40 determines whether the aforementioned process has been completed as regards all of the pixels (step S540), and repeats the process of the steps S531 to S539 while also incrementing the target pixel position (x, y) until the process is concluded for all of the pixels.

According to the third embodiment described above, a dot is formed without a wait for the determination by the error diffusion when the target pixel data Dn is not less than the dither threshold value THn_d, due to the process of the tentative dither. As such, a dot will necessarily be formed when the result of the tentative dither is ON. This corresponds to being the same as when a large negative value, e.g., the value of negative infinity has been set as the low threshold value THe_L. For this reason, it is possible to obtain a processing result similar to a case where the value of the low threshold value THe_L has been set to a value smaller than the lower limit value of the range of gradation values, due to the result of determination of the tentative dither; by using less processing, it is possible to achieve substantially the same actions and effects as the first embodiment.

According to the printer 20 of the present embodiments, as described using the first through third embodiments, missing dots and the like are less likely to occur and high image quality can be maintained in the printing of line graphics and characters. Moreover, without determination of whether a region is a fine line or character, it is possible to realize a method of halftone processing which behaves as though dithering-based processing and error diffusion-based processing are switched automatically depending on the region. Also, at the same gradation value, it is possible to take full advantage of dithering and advantage of the error diffusion method, which has excellent linear rendering reproducibility. For this reason, there is no need for a decision based on trial and error regarding the gradation areas in which and extent to which to make a switch from the error diffusion method, which is suitable for low-gradation regions where linear rendering reproducibility is a principal issue, to the dithering method, which is suitable for medium- to high-gradation regions where the deterioration in graininess caused by landing position deviation is a principal issue. As such, it is possible to avoid the drawbacks where the respective effects of each approach decrease or where the graininess is degraded in the regions of switching between the two approaches.

D. Modification Examples:

D-1. Modification Example 1:

In the embodiments, the blue noise mask having a characteristic that is similar to error diffusion was used as the dither mask, but a dispersed-dot ordered dither having a regular pattern, such as a Bayer dither, may also be used. In such a case, it is possible to solve the greatest challenge of Bayer-type dithering, which is that "In some instances, lines are lost". When a halftone dot dither, or a concentrated-dot dither such as a green noise mask is used, it is still possible to solve problems such as where lines become broken and disconnected at a halftone dot pitch, and this is useful. This is because the error diffusion method acts in fine line sections while a Bayer, halftone dot, green noise mask, or other such dither pattern is used with ordinary sections having two-dimensional spread, and it is possible to realize a halftone that can be reproduced without losing or breaking the fine lines.

D-2. Modification Example 2:

In the second embodiment, when making the factor αdr by which the target pixel data Dn is multiplied be a mathematical function of the target pixel data Dn, a look-up table may be consulted to find the factor αdr. So doing makes it possible to set the factor αdr freely. Not only may there be changes in accordance with the gradation value of the image, but also there may be modifications by determining the type of image (whether the image is a linear graphic or a natural image, or the like). The factor αdr may be set for every color of ink. So doing in color printing would make it possible to modify the ratio between the dots generated by dithering and the dots generated by error diffusion, for every ink. Moreover, in a printer capable of generating a plurality of types of ink droplets, such as large, medium, and small ink droplets, the factor αdr may be set for every type of dot in a case where a configuration is employed with which the halftone process is carried out after the dot generation rate for each of the types of dots is found from the gradation value using a look-up table or the like.

D-3. Modification Example 3:

When the error diffusion method is being applied, the error diffusion range need not only be modified as appropriate depending on the target pixel data Dn, but may also be modified depending on, for example, the result of determination of the tentative dither. Alternatively, a result value RSLT for a case where it is found that a dot should be formed may be modified depending on the result of determination of the tentative dither. In a case where the dot ON is determined depending on the result of determination of the tentative dither, provided that the result value RSLT for a case where it is found that a dot should be formed is set to a value greater than 255, then there will be a greater diffusion error that is distributed, the generation of a dot in the periphery will be suppressed, and the number of dots in total can be prevented from becoming excessive.

D-4. Modification Example 4:

The embodiments above used the inkjet printer 20 of the line printer type as the printing apparatus, but the present invention may be implemented as another format of printer, e.g., a serial printer that forms dots while the printing head moves in the width direction of the printing medium, a page printer such as a laser printer, or the like. The present invention also is not limited to being a color printer, and may be implemented as a printer for monochrome printing. Moreover, the present invention is not limited to the inkjet type, and can be applied also to a variety of types of printers such as a thermal sublimation-type printer or a dot impact-type printer. With an inkjet printer, aside from the ink being discharged by an electrostrictive element such as a piezoelectric element, it would also be possible to employ one where the ink is discharged by explosive boiling of the ink using a heater (a so-called Bubble Jet™ format), or the like.

The present invention may also be applied to an image processing apparatus that carries out solely image processing. The halftone process illustratively exemplified in FIGS. 3, 12, 13, and elsewhere may be implemented as a dedicated application program that is executed with a computer, or may be implemented on a dedicated apparatus such as an RiP. Alternatively, a computer and printer may be connected together and used, with either a part or the whole of the image processing being executed within a printer driver. Moreover, a dedicated server for carrying out such image processing may be set up on a network and operated in a form that processes image data in response to a request from another computer or printer.

The present invention is in no way limited to the above embodiments, working examples, and modification examples, but rather can be implemented in a variety of configurations within a scope that does not depart from the essence thereof. For example, the technical features in the embodiments, working examples, and modification examples that correspond to the technical features in each of the modes set forth in the section on the summary of the invention can be replaced or combined as appropriate in order to partially or entirely solve the problems mentioned above or in order to partially or entirely achieve the effects mentioned above. These technical features also can be deleted as appropriate, unless described as being essential in the present specification.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A printing apparatus for printing image data representative of a predetermined image, the printing apparatus comprising:
   a processor configured to input the image data,
   the processor being further configured to generate dot data representative of presence or absence of a dot formation on the basis of the image data,
   the processor being further configured to use the generated dot data to print the image,
   the processor being further configured to compare one of a plurality of threshold values and a data gradation value that is a gradation value of the inputted image data, and
   the processor being further configured to generate the dot data by comparing the data gradation value with an error diffusion threshold value that is a threshold value used in determination of presence or absence of a dot formation in an error diffusion method,
   in a case where a result of comparison of the one of the plurality of threshold values and the data gradation value is that the data gradation value is less than the threshold value, the error diffusion threshold value being set to a high threshold value greater than a low threshold value that is set in a case where the data gradation value is not less than the threshold value, and
   the high threshold value being set relative to the data gradation value to have a maximum value that is equal to or higher than a maximum value of the data gradation value while the data gradation value is a predetermined value, and to become lower than the maximum value of the high threshold value while the data gradation value is in a predetermined gradation range that is not less than the predetermined value,
   the high threshold value being further set to monotonically increases in accordance with the data gradation value as far as the predetermined value.

2. The printing apparatus as set forth in claim 1, wherein the high threshold value is set as a value that decreases monotonically with respect to the data gradation value in the predetermined gradation range.

3. The printing apparatus as set forth in claim 1, wherein the plurality of threshold values are prepared as a dither mask that is used for ordered dithering.

4. The printing apparatus as set forth in claim 1, wherein the dither mask has a blue noise characteristic.

5. The printing apparatus as set forth in claim 1, wherein the low threshold value is set to a value less than a minimum value of the data gradation value where the data gradation value is a preset value or below.

6. The printing apparatus as set forth in claim 1, wherein the processor is further configured to generate the dot data on the basis of the result of comparison in a case where the data gradation value is not less than the threshold value in a predetermined range including the predetermined value.

7. The printing apparatus as set forth in claim 1, wherein when gradation error produced in association with generation of the dot data is being diffused to a plurality of pixels of a periphery of a target pixel for which the dot data is generated, the processor is further configured to carry out error diffusion so that a sum of gradation error diffused to the plurality of pixels of the periphery is less than the produced gradation error in at least a part of a predetermined gradation range not less than the predetermined value.

8. The printing apparatus as set forth in claim 7, wherein the processor is further configured to decide an amount of diffusion by which the produced gradation error is diffused to each of the plurality of pixels of the periphery by multiplying the gradation error produced in the target pixel by a diffusion factor establishing a proportion of diffusion to each of the pixels of the periphery, a sum of the diffusion factor being less than 1.

9. A printing data generation apparatus for generating printing data of image data representative of a predetermined image, the printing data generation apparatus comprising:
   a processor configured to input the image data,
   the processor being further configured to generate dot data representative of presence or absence of a dot formation on the basis of the image data,
   the processor being further configured to compare one of a plurality of threshold values and a data gradation value that is a gradation value of the inputted image data, and
   the processor being further configured to generate the dot data by comparing the data gradation value with an error diffusion threshold value that is a threshold value used in determination of presence or absence of a dot formation in an error diffusion method,
   in a case where a result of comparison of the one of the plurality of threshold values and the data gradation value is that the data gradation value is less than the threshold value, the error diffusion threshold value being set to a high threshold value greater than a low threshold value that is set in a case where the data gradation value is not less than the threshold value, and the high threshold value being set relative to the data gradation value to have a maximum value that is equal to or higher than a maximum value of the data gradation value while the data gradation value is a predetermined value, and to become lower than the maximum value of the high threshold value while the data gradation value is in a predetermined gradation range that is not less than the predetermined value, the high threshold value being further set to monotonically increases in accordance with the data gradation value as far as the predetermined value.

10. A method for generating printing data of image data representative of a predetermined image, the method of generating printing data comprising:

inputting the image data;

comparing one of a plurality of threshold values and a data gradation value that is a gradation value of the inputted image data;

in a case where a result of comparison of the one of the plurality of thresholds and the data gradation value is that the data gradation value is less than the threshold value, setting an error diffusion threshold value that is a threshold value used in determination of presence or absence of a dot formation in an error diffusion method to a high threshold value greater than a low threshold value that is set in a case where the data gradation value is not less than the threshold value; and using the set error diffusion threshold value to generate dot data representative of presence or absence of a dot formation by the error diffusion method, the high threshold value being set relative to the data gradation value to have a maximum value that is equal to or higher than a maximum value of the data gradation value while the data gradation value is a predetermined value, and to become lower than the maximum value of the high threshold value while the data gradation value is in a predetermined gradation range that is not less than the predetermined value, the high threshold value being further set to monotonically increase in accordance with the data gradation value as far as the predetermined value.

11. A non-transitory computer readable medium storing a printing data generation program for generating printing data of image data representative of a predetermined image, the printing data generation program causing a computer to implement:

a function for inputting the image data;

a function for comparing one of a plurality of threshold values and a data gradation value that is a gradation value of the inputted image data;

in a case where a result of comparison of the one of the plurality of thresholds and the data gradation value is that the data gradation value is less than the threshold value, a function for setting an error diffusion threshold value that is a threshold value used in determination of presence or absence of a dot formation in an error diffusion method to a high threshold value greater than a low threshold value that is set in a case where the data gradation value is not less than the threshold value; and a function for using the set error diffusion threshold value to generate dot data representative of presence or absence of a dot formation by the error diffusion method, the high threshold value being set relative to the data gradation value to have a maximum value that is equal to or higher than a maximum value of the data gradation value while the data gradation value is a predetermined value, and to become lower than the maximum value of the high threshold value while the data gradation value is in a predetermined gradation range that is not less than the predetermined value, the high threshold value being further set to monotonically increase in accordance with the data gradation value as far as the predetermined value.

* * * * *